United States Patent
Todo et al.

(10) Patent No.: US 12,527,335 B2
(45) Date of Patent: Jan. 20, 2026

(54) FROZEN DESSERT

(71) Applicant: LOTTE CO., LTD., Tokyo (JP)

(72) Inventors: Junko Todo, Saitama (JP); Hisashi Kanbe, Saitama (JP); Naoya Akiyama, Saitama (JP)

(73) Assignee: LOTTE CO., LTD., Tokyo (JP)

( * ) Notice: Subject to any disclaimer, the term of this patent is extended or adjusted under 35 U.S.C. 154(b) by 0 days.

(21) Appl. No.: 18/558,342

(22) PCT Filed: May 13, 2021

(86) PCT No.: PCT/JP2021/018143
§ 371 (c)(1),
(2) Date: Oct. 31, 2023

(87) PCT Pub. No.: WO2022/239168
PCT Pub. Date: Nov. 17, 2022

(65) Prior Publication Data
US 2024/0268411 A1    Aug. 15, 2024

(51) Int. Cl.
*A23G 9/34* (2006.01)
*A23G 9/42* (2006.01)

(52) U.S. Cl.
CPC ........ *A23G 9/34* (2013.01); *A23G 9/42* (2013.01)

(58) Field of Classification Search
CPC .................................................. A23G 9/34
See application file for complete search history.

(56) References Cited

U.S. PATENT DOCUMENTS

| | | | |
|---|---|---|---|
| 2003/0147995 A1* | 8/2003 | Koss | A23G 9/42 426/72 |
| 2008/0131574 A1* | 6/2008 | Aldred | A23G 9/045 426/519 |
| 2010/0203202 A1 | 8/2010 | Quessette et al. | |
| 2011/0020525 A1 | 1/2011 | Homsma et al. | |
| 2013/0232992 A1* | 9/2013 | Bisceglie | F25C 1/00 62/66 |
| 2018/0103657 A1 | 4/2018 | Edara et al. | |
| 2018/0192667 A1* | 7/2018 | Barey | A23G 9/42 |

FOREIGN PATENT DOCUMENTS

| | | | |
|---|---|---|---|
| CN | 106260475 | 1/2017 | |
| CN | 107484869 | 12/2017 | |
| JP | 2004-135518 A | 5/2004 | |
| JP | 2010-535018 A | 11/2010 | |
| WO | WO-2006007922 A2 * | 1/2006 | ............ A23G 9/045 |
| WO | WO 2018/216748 | 11/2018 | |

OTHER PUBLICATIONS

Brainly, "Specific gravity of ice". Available online as of Aug. 2, 2019. pp. 1-9. (Year: 2019).*
Marshall, R.T. and Arbuckle, W.S., "Ice Cream", Chapman and Hall, 1996, pp. 166-171.
International Search Report of the International Searching Authority directed to related International Patent Application No. PCT/JP2021/018143, mailed Jul. 13, 2021, with attached English-language translation; 6 pages.
Decision to Grant from priority Japanese patent application No. 2022-034915, dated Jul. 25, 2022, and machine translation, 6 pages.
Notice of Reasons for Refusal from priority Japanese patent application No. 2022-034915, dated Jun. 1, 2022, and machine translation, 4 pages.
Decision to Grant from priority Japanese patent application No. 2021-535635, dated May 25, 2022, and machine translation, 6 pages.
Notice of Reasons for Refusal from priority Japanese patent application No. 2021-535635, dated Jan. 5, 2022, and machine translation, 4 pages.
Translation of Certificate of Application for Exception to Loss of Novelty for an Invention submitted in JP 2021-535635 with Attachment listing the destination of the shipments, shipment dates and amounts.

* cited by examiner

*Primary Examiner* — Jenna A Watts
(74) *Attorney, Agent, or Firm* — Sterne, Kessler, Goldstein & Fox P.L.L.C.

(57) ABSTRACT

It is an object of the present invention to provide a frozen dessert which suppresses separation between a liquid and a solid (at least one solid when there are a plurality of solids). The object can be attained by a frozen dessert including an ice mix, a dietary fiber derived from a citrus fruit, and a food solid.

9 Claims, No Drawings

FROZEN DESSERT

STATEMENT REGARDING PRIOR DISCLOSURE BY THE INVENTORS OR A JOINT INVENTOR UNDER 37 C.F.R.1.77(b)(6)

Product shipments related to the instant invention were made by Applicant LOTTE CO., LTD less than one year prior to the filing of priority document JP 2021-535635. LOTTE CO., LTD shipped a frozen dessert including: an ice mix; a dietary fiber derived from a citrus fruit; and a food solid, which frozen dessert was invented by Junko Todo, Hisashi Kanbe and Naoya Akiyama. A translation of a "Certificate of Application For Exception to Loss of Novelty for an Invention" submitted in JP 2021-535635 and an "Attachment" listing the destination of the shipments, shipment dates, and amounts shipped are provided with a concurrently submitted Information Disclosure Statement pursuant to the guidance of 78 Fed. Reg. 11076 (Feb. 14, 2013).

TECHNICAL FIELD

The present invention relates to a frozen dessert.

BACKGROUND ART

Although a frozen dessert can be eaten as it is, the frozen dessert can also be eaten as a frozen drink by being added with a liquid such as milk. In the case of a frozen dessert in a form of a frozen drink, the solid contained in the frozen dessert and the liquid such as milk are mixed therein. In such a state, the solid may float or sink, to be separated from the liquid (e.g., Patent Document 1).

Patent Document 1 discloses use of deacylated gellan gum for the purpose of suppressing the foregoing separation of the solid without increasing the viscosity of the product. Specifically, Patent Document 1 discloses "a solid dispersion composition including a solid that is insoluble in water and dispersed in an oil-in-water type emulsion composition forming a continuous phase, wherein the oil-in-water type emulsion composition includes deacylated gellan gum".

CITATION LIST

Patent Document

Patent Document 1: Patent Publication JP-A-2004-135518

SUMMARY OF INVENTION

Technical Problem

It is an object of the present invention to provide a frozen dessert which suppresses separation between a liquid and a solid (at least one solid when there are a plurality of solids) with a different method from that of Patent Document 1.

Solution to Problem

As a result of a diligent study by the present inventors, it has been found that the object can be attained by using a dietary fiber derived from a citrus fruit.

The present invention includes the following embodiments.

A frozen dessert, including:
an ice mix;
a dietary fiber derived from a citrus fruit; and
a food solid.

The frozen dessert according to [1], in which the citrus fruit is a citrus fruit of genus Citrus.

The frozen dessert according to [2], in which the citrus fruit of genus Citrus is a lemon or an orange.

The frozen dessert according to any of [1] to [3], in which an amount of the dietary fiber derived from the citrus fruit is 0.005 to 3% by mass based on the mass of the frozen dessert.

The frozen dessert according to any of [1] to [4], in which the dietary fiber derived from the citrus fruit includes a water-insoluble dietary fiber, and the amount of the water-insoluble dietary fiber is 50 to 90% by mass based on the mass of the dietary fiber derived from the citrus fruit.

The frozen dessert according to any of [1] to [5], in which the dietary fiber derived from the citrus fruit includes a water-soluble dietary fiber, and the amount of the water-soluble dietary fiber is 5 to 30% by mass based on the mass of the dietary fiber derived from the citrus fruit.

The frozen dessert according to any of [1] to [6], in which the specific gravity of the food solid is 0.7 to 1.2.

The frozen dessert according to any of [1] to [7], in which the food solid includes ice, and the amount of the ice is 15 to 75% by mass based on the mass of the frozen dessert.

The frozen dessert according to any of [1] to [8], in which the food solid includes a food solid other than ice, and the amount of the food solid other than ice is 1 to 20% by mass based on the mass of the frozen dessert.

The frozen dessert according to any of [1] to [9], in which the food solid includes ice, and the length of the ice is 0.06 to 14 mm.

The frozen dessert according to any of [1] to [10], in which the food solid includes a food solid other than ice, and the length of the food solid other than ice is 0.9 to 14 mm.

The frozen dessert according to any of [1] to [11], in which a concave part is formed in the surface of the frozen dessert.

Advantageous Effects of Invention

The present invention can provide a frozen dessert which suppresses separation between a liquid and a solid.

DESCRIPTION OF EMBODIMENTS

Below, embodiments of the present invention will be described specifically. However, the present invention is not limited thereto, and can be various modified within the scope not departing from the gist thereof.

<Frozen Dessert>

One embodiment of the present invention relates to a frozen dessert including an ice mix, a dietary fiber derived from a citrus fruit (which will be hereinafter referred to simply as a "citrus fiber"), and a food solid.

The frozen dessert in accordance with the present embodiment can suppress separation between a liquid and a solid (at least one solid when there are a plurality of solids) (herein after referred to as "solid-liquid separation") by containing a citrus fiber even when the liquid (e.g., milk, hot water, water, coffee, tea, flavor tea, or fruit tea) and the solid are mixed (e.g., a frozen drink). As one example, it is possible to suppress the solid-liquid separation when a consumer has added and mixed a liquid such as hot water or milk to the frozen dessert in accordance with the present embodiment at the storefront. Further, also during the manufacturing process of the frozen dessert, the occurrence of solid-liquid separation in a tank results in uneven amounts of the solid among respective containers when frozen desserts are filled in the containers, respectively. With the frozen dessert in accordance with the present embodiment, it is also possible to avoid the problem.

The reason why the citrus fiber can suppress the solid-liquid separation can be assumed as follows. However, the present invention is not limited by the following assumed reason at all.

Namely, it is assumed as follows: the citrus fiber contains long and large particles formed of an insoluble dietary fiber, and will be swollen when added with water and applied with a pressure, so that a gap is formed; thus, a solid is captured in the gap of the citrus fibers crossing each other complicatedly, thereby suppressing the solid-liquid separation. Actually, the frozen dessert containing citrus fibers shows dewy and wet appearances of the surface. This is assumed to be caused by the fact that a citrus fiber captures the solid in a water-containing state. Such appearances are not observed when a water-soluble polysaccharide such as Locust Bean Gum to be generally used for suppressing the separation of an ice mix. Incidentally, a conventional water-soluble polysaccharide constructs a network in an aqueous solution, and fine particles of a lipid, or the like are dispersed in the network for stabilization. However, when a solid with a large specific gravity enters, the solid cannot be fully captured in the network, and will be separated.

As used herein, the term "frozen dessert" refers to a dessert stored under freezing conditions such as ice creams and ice sweets, and does not include a dessert stored in a chilled temperature range such as pudding.

Ice creams include ice cream, ice milk, and lacto ice. The "ice creams", the "ice cream", the "ice milk", and the "lacto ice" in the present description are in accordance with the provisions of "Ministerial Ordinance Concerning Compositional Standards, etc., for Milk and Milk Products" (MHLW Ordinance No. 106 dated Aug. 8, 2018).

Specifically, the ice creams are products obtained by freezing after processing milk or food produced from milk as a raw material, or after setting milk or food produced from milk as a main raw material, and each of the products contains 3.0% or more of milk solids (except for fermented milk).

The ice cream is a product containing 15.0% or more of milk solids and 8.0% or more of milk fat.

The ice milk is a product containing 10.0% or more of milk solids and 3.0% or more of milk fat (except for the ice cream).

The lacto ice is a product containing 3.0% or more of milk solids (except for the ice cream and the ice milk).

Ice sweets are frozen sugar solutions or frozen liquids having a mixture of a frozen sugar solution and other foods, or crushed edible ice mixed with a sugar solution or other foods and re-frozen. Ice sweets are eaten frozen.

The frozen dessert in accordance with the present embodiment is preferably eaten by being mixed with a liquid (e.g., milk, water, hot water, coffee, tea, flavor tea, or fruit tea). Just in case of mixing with a liquid, the frozen dessert in accordance with the present embodiment may have a concave part for accommodating the liquid. The concave part is preferably formed in the surface of the frozen dessert. Herein, the term "the surface of the frozen dessert" means the surface not in contact with the container. The size of the concave part may be appropriately adjusted according to the amount of the liquid to be mixed.

[Ice Mix]

The frozen dessert in accordance with the present embodiment includes an ice mix. The kind of the ice mix has no particular restriction, and those used for general frozen desserts are usable. The components of the ice mix vary according to the kind of the frozen dessert. Examples thereof may include carbohydrates (including saccharides and polysaccharides), fruit juice, fats and oils, milk product, emulsifier, stabilizer, perfume, colorant, acidulant, pH adjuster, water, egg, salt, and auxiliary raw materials presenting a flavor such as chocolate and powdered tea.

The amount of the ice mix can be set at, for example, 25 to 95% by mass, 30 to 80% by mass, or 35 to 70% by mass based on the mass of the frozen dessert.

[Citrus Fiber]

The frozen dessert in accordance with the present embodiment includes a citrus fiber. The citrus fiber is preferably derived from a citrus fruit of the genus Citrus, and is more preferably derived from a lemon or an orange. Specific examples of the citrus fiber may include Herbacel AQ Plus CF-D100, Lemon Fiber 100FG, and CITRI-FI 100FG. The citrus fibers may be used singly alone, or may be used in combination of two or more thereof. Inclusion of the citrus fiber can suppress the solid-liquid separation when the frozen dessert is formed as a frozen drink, or the like.

The citrus fiber preferably includes a water-insoluble dietary fiber. The amount of the water-insoluble dietary fiber is preferably 30 to 95% by mass, more preferably 50 to 90% by mass, and further preferably 60 to 85% by mass. By setting the amount of the water-insoluble dietary fiber within the foregoing ranges, the solid-liquid separation tends to be further suppressed. The amount of the water-insoluble dietary fiber can be measured by the modified Prosky method.

The citrus fiber may include a water-soluble dietary fiber. Examples of the amount of the water-soluble dietary fiber may include 1 to 50% by mass, 5 to 30% by mass, or 10 to 20% by mass. The amount of the water-soluble dietary fiber can be measured by the modified Prosky method.

The amount of the citrus fiber is preferably 0.005 to 3% by mass, more preferably 0.01 to 1% by mass, further preferably 0.015 to 0.5% by mass, and in particular preferably 0.1 to 0.3% by mass based on the mass of the frozen dessert. By setting the amount of the citrus fiber at 0.01% by mass or more, the solid-liquid separation can be further suppressed. By setting the amount of the citrus fiber at 1% by mass or less, a desirable texture can be obtained, and favorable manufacturing appropriateness can be achieved.

The frozen dessert in accordance with the present embodiment may include, or may not include deacylated gellan gum in addition to the citrus fiber.

[Food Solid]

The frozen dessert in accordance with the present embodiment includes a food solid. In the present description, the "food solid" means an edible solid. Examples of the food solid may include ice, chocolates, fleshes of fruits, seeds and nuts, baked sweets (e.g., a crunchy), and cut jelly. The food solids may be used singly alone, or may be used in combination of two or more thereof.

The specific gravity of the food solid is preferably 0.3 to 1.7, more preferably 0.5 to 1.5, and further preferably 0.7 to 1.2. By setting the specific gravity of the food solid within the foregoing ranges, it is possible to further suppress the solid-liquid separation.

The length of the food solid may be appropriately changed according to the kind of the food solid. In the present description, the "length" of the food solid means the distance between two points at which the distance between given two points at the outer edge of the food solid photographed using an optical microscope, or observed by the naked eye are maximized.

When the food solid is ice, the length is preferably 0.06 to 14 mm, and more preferably 0.06 to 1.0 mm. By setting the length of the ice within the foregoing ranges, it is possible to give a smooth texture and a sense of coolness. Further, it is possible to further suppress the solid-liquid separation.

As the length distribution of ice, for example, preferably, 80% or more of the total number of ices each have a length of 0.06 to 14 mm, and more preferably, 90% or more of the total number of the ices each have a length of 0.06 to 14 mm.

Further, preferably, 80% or more of the total number of the ices each have a length of 0.06 to 1.0 mm, and more preferably, 90% or more of the total number of the ices each have a length of 0.06 to 1.0 mm.

When the food solid is a food solid other than ice (which will be hereinafter referred to as a "second food solid", and it is not essential that the food solid includes ice, and the frozen dessert may include only the second food solid), the length is preferably 0.3 to 20 mm, and more preferably 0.9 to 14 mm. By setting the length of the second food solid within the foregoing ranges, it is possible to further suppress the solid-liquid separation.

As the length distribution of the second food solid, for example, preferably, 80% or more of the total number of the second food solids each have a length of 0.3 to 20 mm, and more preferably, 90% or more of the total number of the second food solids each have a length of 0.3 to 20 mm.

Further, preferably, 80% or more of the total number of the second food solids each have a length of 0.9 to 14 mm, and more preferably, 90% or more of the total number of the second food solids each have a length of 0.9 to 14 mm.

The amount of the food solid may be appropriately changed according to the kind of the food solid.

When the food solid is ice, the amount thereof is preferably 1 to 30% by mass, more preferably 1 to 20% by mass, and further preferably 1 to 10% by mass based on the mass of the frozen dessert.

When the food solid is the second food solid, the amount thereof is preferably 1 to 20% by mass, more preferably 2 to 10% by mass, and further preferably 3 to 6% by mass based on the mass of the frozen dessert.

EXAMPLES

Below, the present invention will be described in more details by reference to Examples and Comparative Examples. However, the technical scope of the present invention is not limited thereto.

Materials

The materials used in Examples and Comparative Examples are as follows.
1. Ice Mix
(1) Watermelon Ice Mix
The component composition of a watermelon ice mix is as shown in Table 1.

(2) La France Ice Mix
The component composition of a La France ice mix is as shown in Table 1.

TABLE 1

|  |  | Watermelon | La France |
|---|---|---|---|
| Total solid content |  | 40 | 47 |
| Saccharides |  | 42 | 45 |
| Concentrated juice (in straight terms) |  | 13 | 22 |
| Fats and oils |  | 0.7 | 0.6 |
| Dairy products | Non-fat dry milk | — | 0.1 |
|  | Salt | 0.02 | — |
| Dietary fiber |  | 0.4 | 0.3 |
| (Fibryxa: Isomalt Dextrin) |  |  |  |
| Others | Emulsifier | 0.4 | 0.1 |
|  | Stabilizer | 0.5 | 0.5 |
|  | Perfume | 0.04 | 0.07 |
|  | Colorant | 0.1 | — |
|  | Acidulant | 0.3 | 0.3 |
|  | pH adjuster | 0.2 | 0.2 |
| Water is added to a total of 100 |  | 100 | 100 |

Numerical values in table means % by mass.
2. Citrus Fiber
(1) Dietary Fiber Derived from Lemon
(DSP GOKYO FOOD & CHEMICAL CO., LTD./Herbafood Company, Herbacel AQ PLUS CF-D100)
(Composition: water-insoluble dietary fiber about 73% by mass, water-soluble dietary fiber about 17% by mass)
(2) Dietary Fiber Derived from Lemon
(THE TORIGOE CO., LTD./FIBER STAR CO., LEMON FIBER 100FG)
(Composition: water-insoluble dietary fiber about 33% by mass, water-soluble dietary fiber about 37% by mass)
(3) Dietary Fiber Derived from Orange
(THE TORIGOE CO., LTD./FIBER STAR CO., CITRI-FI 100FG)
(Composition: water-insoluble dietary fiber about 33% by mass, water-soluble dietary fiber about 37% by mass)
3. Other Dietary Fibers
(1) Microcrystalline Cellulose
(ASAHI KASEI CO., LTD., CEOLUS RC-N81)
(Composition: cellulose 80% by mass, karaya gum 10% by mass)
(2) Pectin
(KYOKUTO CHEMICAL INDUSTRIAL CO., LTD., pectin IM)
(Composition: pectin 100% by mass)
4. Macromolecular Polysaccharides
Deacylated gellan gum
(DSP GOKYO FOOD & CHEMICAL CO., LTD., KELCOGEL KB)
5. Food Solid
(1) Ice Piece
(Specific gravity: about 0.9)
(2) Chocolate
(FUJI OIL CORPORATION LTD., Couverture bitter flake)
(Specific gravity: about 1.3)
(3) Chocolate
(Furuta Confectionery Co., Ltd., Black Crunch B-LO)
(Specific gravity: about 0.8)
<Manufacturing of Frozen Dessert>
The materials shown in Tables 2 to 6 were mixed in prescribed ratios, and were cooled, thereby manufacturing various kinds of frozen desserts. Incidentally, the Fibryxa shown in the Tables is a component originally included in an ice mix. In the Tables, Fibryxa and an ice mix are described separately.

For evaluation, into a cup (85 mm in top inside diameter, 56 mm in bottom inside diameter, and 110 mm in height), only the ice mix, or ice and the ice mix were placed in a total amount of 200 g, which was adjusted to an overrun of 30%. Freezing was performed at −4° C. to −8° C. Subsequently, if required, a solid such as chocolate (10 g) was added and mixed thereto.

<Evaluation of Frozen Dessert>

[1. Solid-Liquid Separation Suppression (Evaluation Target: Ice Piece); Standing Condition]

A manufactured frozen dessert was allowed to stand at 5° C. or 22° C., and separation of an ice piece was visually observed. Upon standing, the frozen dessert is largely separated into 3 layers. The upper layer mainly includes foam and fat; the intermediate layer mainly includes ice; and the lower layer mainly includes a sugar liquid. For the evaluation, with the interface between the intermediate layer and the lower layer as the observation index for separation suppression, the cup side surface was observed, and 100 minutes later, the difference in interface upon comparison with Comparative Example was measured. Various frozen desserts were evaluated according to the following evaluation criteria. The evaluation results are shown in Tables 2 to 6.

Incidentally, the combinations of Examples and Comparative Examples compared to each other are as follows. For Examples 1, and 9 to 11, there are two comparison controls. Comparison with any Comparative Examples indicates the results shown in Tables.

Comparative Example 1: Examples 1, 25, and 29
Comparative Example 2: Example 1
Comparative Example 3: Examples 6, 9, 12, 15, and 18
Comparative Example 4: Examples 7, 10, 13, 16, and 19
Comparative Example 5: Examples 8, 11, 14, 17, and 20
Comparative Example 6: Examples 3, 26, 30, and 9
Comparative Example 7: Examples 4, 27, 31, and 10
Comparative Example 8: Examples 5, 28, 32, and 11
Comparative Example 9: Examples 21 and 23
Comparative Example 10: Examples 22 and 24
Comparative Example 11: Example 2
Comparative Example 13: Example 33

Evaluation Criteria

A: Remarkable separation suppressing effect is observed (there is a difference in interface of 5 mm or more than Comparative Example);
B: Separation suppressing effect is observed (there is a difference in interface of 2 mm or more than Comparative Example); and
C: No separation suppressing effect (equivalent to Comparative Example)

[2. Solid-Liquid Separation Suppression (Evaluation Target: Ice Piece; Liquid Addition Condition)]

To the manufactured frozen dessert, 50° C. milk or hot water was added in an amount of 70 g, and mixed, and the separation of the ice piece was visually observed. Upon standing, the resulting mixture is largely separated into 3 layers. The upper layer mainly includes foam and fat; the intermediate layer mainly includes ice; and the lower layer mainly includes a sugar liquid. For the evaluation, with the interface between the intermediate layer and the lower layer as the observation index for separation suppression, the cup side surface was observed, and 30 minutes later, the difference in interface upon comparison with Comparative Example was measured. The combinations of Examples and Comparative Examples compared to each other are as described above. Various frozen desserts were evaluated according to the following evaluation criteria. The evaluation results are shown in Tables 2 to 6.

Evaluation Criteria

A: Remarkable separation suppressing effect is observed (there is a difference in interface of 5 mm or more than Comparative Example);
B: Separation suppressing effect is observed (there is a difference in interface of 2 mm or more than Comparative Example); and
C: No separation suppressing effect (equivalent to Comparative Example)

[3. Ununiformization Suppression (Evaluation Target: Chocolate)]

The manufactured frozen dessert was allowed to stand at 22° C., and the separation of chocolate was visually observed. Various frozen desserts were evaluated according to the following evaluation criteria. The evaluation results are shown in Tables 2 to 6.

(Evaluation Criteria: Solid i)
A: The solids i are uniformly dispersed;
B: The solids i are partially collected at the upper part or the lower part of the product part; and
C: Most of the solids i are collected at the upper part or the lower part.

(Evaluation Criteria: Solid ii)
A: The solids ii are uniformly dispersed at the product part, seeing the side surface of the cup;
B: Although the solids ii partially sink to the bottom, most thereof are uniformly dispersed at the product part, seeing the side surface of the cup; and
C: Most of the solids ii sink to the bottom, seeing the side surface of the cup.

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
| --- | --- | --- | --- | --- | --- | --- | --- | --- | --- | --- | --- |
| Ice mix kind | Watermelon | Watermelon | La France | La France | La France | La France | La France | La France | La France | La France | La France |
| Dietary fiber derived from citrus fruits kind | — | — | — | — | — | — | — | — | — | — | — |
| Ice mix (parts | 49.8 | 49.7 | 49.8 | 47.4 | 47.4 | 69.8 | 66.4 | 66.4 | 94.9 | 94.9 | 69.8 |

TABLE 2-continued

|  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| by mass) Dietary fiber derived from citrus fruits (parts by mass) | — | — | — | — | — | — | — | — | — | — | — |
| Other dietary fibers A(parts by mass) | 0.17 | 0.17 | 0.17 | 0.16 | 0.16 | 0.24 | 0.23 | 0.23 | 0.32 | 0.32 | 0.24 |
| Other dietary fibers B(parts by mass) | — | 0.08 | — | — | — | — | — | — | — | — | — |
| Ice piece (parts by mass) | 50 | 50 | 50 | 47.6 | 47.6 | 30 | 28.6 | 28.6 | — | — | 30 |
| Solid i (parts by mass) | — | — | — | 4.8 | — | — | 4.8 | — | 4.8 | — | — |
| Solid ii (parts by mass) | — | — | — | — | 4.8 | — | — | 4.8 | — | 4.8 | — |
| Total: Frozen dessert (parts by mass) | 100 | 100 | 100 | 100 | 100 | 100 | 100 | 100 | 100 | 100 | 100 |
| Solid-liquid separation suppression (Evaluation target: Ice piece)Standing condition | C (Condition 1) | C (Condition 1) | C (Condition 2) | C (Condition 2) | C (Condition 2) | C (Condition 2) | C (Condition 2) | C (Condition 2) | C (Condition 2) | C (Condition 2) | — |
| Solid-liquid separation suppression (Evaluation target: Ice piece)liquid addition condition | — | — | C (Condition 4) | C (Condition 4) | C (Condition 4) | C (Condition 4) | C (Condition 4) | C (Condition 4) | — | — | C (Condition 3) |
| Ununiformization suppression (Evaluation target: Solid i)Standing condition | — | — | — | C | — | — | C | — | C | — | — |
| Ununiformization suppression (Evaluation target: Solid i)liquid addition condition | — | — | — | C | — | — | C | — | — | — | — |
| Ununiformization suppression (Evaluation target: Solid ii)Standing condition | — | — | — | — | C | — | — | B | — | C | — |
| Ununiformization suppression (Evaluation target: Solid ii)liquid addition condition | — | — | — | — | C | — | — | C | — | — | — |

Other dietary fibers A: Fibryxa
Other dietary fibers B: CEOLUS RC-N81 + Pectin IM(total composition: cellulose 0.147%, Karaya gum 0.018%, Pectin 0.0015%)
Solid i: Black Crunch B-LO (specific gravity: about 0.8)
Solid ii: Couverture bitter flake (specific gravity: about 1.3)
Condition 1: standing at 5° C.,
condition 2: standing at 22° C.
Condition 3: milk is added,
Condition 4: hot water is added

TABLE 3

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Ice mix kind | Watermelon | La France | La France | La France | La France | La France | La France | La France | La France | La France | La France |
| Dietary fiber derived from citrus fruits kind | Herbacel | Herbacel | Herbacel | Herbacel | Herbacel | Herbacel | Herbacel | Herbacel | Herbacel | Herbacel | Herbacel |
| Ice mix (parts by mass) | 49.7 | 69.6 | 69.6 | 66.2 | 66.2 | 49.7 | 47.3 | 47.3 | 59.7 | 56.8 | 56.8 |
| Dietary fiber derived from citrus fruits (parts by mass) | 0.10 | 0.14 | 0.14 | 0.13 | 0.13 | 0.10 | 0.10 | 0.10 | 0.12 | 0.11 | 0.11 |
| Other dietary fibers A (parts by mass) | 0.17 | 0.24 | 0.24 | 0.23 | 0.23 | 0.17 | 0.16 | 0.16 | 0.20 | 0.19 | 0.19 |
| Ice piece (parts by mass) | 50 | 30 | 30 | 28.6 | 28.6 | 50 | 47.6 | 47.6 | 40 | 38.1 | 38.1 |
| Solid i (parts by mass) | — | — | — | 4.8 | — | — | 4.8 | — | — | 4.8 | — |
| Solid ii (parts by mass) | — | — | — | — | 4.8 | — | — | 4.8 | — | — | 4.8 |
| Total: Frozen dessert (parts by mass) | 100 | 100 | 100 | 100 | 100 | 100 | 100 | 100 | 100 | 100 | 100 |
| Solid-liquid separation suppression (Evaluation target: Ice piece) Standing condition | A (Condition 1) | — | A (Condition 2) | A (Condition 2) | A (Condition 2) | A (Condition 2) | A (Condition 2) | A (Condition 2) | A (Condition 2) | A (Condition 2) | A (Condition 2) |
| Solid-liquid separation suppression (Evaluation target: Ice piece) liquid addition condition | — | A (Condition 3) | A (Condition 4) | A (Condition 4) | A (Condition 4) | A (Condition 4) | A (Condition 4) | A (Condition 4) | A (Condition 4) | A (Condition 4) | A (Condition 4) |
| Ununiformization suppression (Evaluation target: Solid i) Standing condition | — | — | — | A | — | — | A | — | — | A | — |
| Ununiformization suppression (Evaluation target: Solid i) liquid addition condition | — | — | — | A | — | — | A | — | — | A | — |
| Ununiformization suppression (Evaluation target: Solid ii) Standing condition | — | — | — | — | A | — | — | A | — | — | A |
| Ununiformization suppression (Evaluation target: Solid i) liquid addition condition | — | — | — | — | A | — | — | A | — | — | A |

Other dietary fibers A: Fibryxa
Solid i: Black crunch B-LO (sepcific gravity: about 0.8)
Solid ii: Couverture bitter flake (sepcific gravity: about 1.3)
Condition 1: standing at 5° C.,
Condition 2: standing at 22° C.
Condition 3: milk is added,
Condition 4: hot water is added

TABLE 4

| | Example 12 | Example 13 | Example 14 | Example 15 | Example 16 | Example 17 | Example 18 |
|---|---|---|---|---|---|---|---|
| Ice mix kind | La France | La France | La France | La France | La France | La France | La France |
| Dietary fiber derived from citrus fruits kind | Herbacel | Herbacel | Herbacel | Herbacel | Herbacel | Herbacel | Herbacel |
| Ice mix (parts by mass) | 39.8 | 37.9 | 37.9 | 49.8 | 47.4 | 47.4 | 49.3 |
| Dietary fiber derived from citrus fruits (parts by mass) | 0.08 | 0.08 | 0.08 | 0.02 | 0.02 | 0.02 | 0.50 |
| Other dietary fibers A(parts by mass) | 0.14 | 0.13 | 0.13 | 0.17 | 0.16 | 0.16 | 0.17 |
| Ice piece (parts by mass) | 60 | 57.1 | 57.1 | 50 | 47.6 | 47.6 | 50 |
| Solid i (parts by mass) | — | 4.8 | — | — | 4.8 | — | — |
| Solid ii (parts by mass) | — | — | 4.8 | — | — | 4.8 | — |
| Total: Frozen dessert (parts by mass) | 100 | 100 | 100 | 100 | 100 | 100 | 100 |
| Solid-liquid separation suppression (Evaluation target: Ice piece)Standing condition | A (Condition 2) | A (Condition 2) | A (Condition 2) | A (Condition 2) | A (Condition 2) | A (Condition 2) | A (Condition 2) |
| Solid-liquid separation suppression (Evaluation target: Ice piece)liquid addition condition | A (Condition 4) | A (Condition 4) | A (Condition 4) | A (Condition 4) | A (Condition 4) | A (Condition 4) | A (Condition 4) |
| Ununiformization suppression (Evaluation target: Solid i)Standing condition | — | A | — | — | A | — | — |
| Ununiformization suppression (Evaluation target: Solid i)liquid addition condition | — | A | — | — | A | — | — |
| Ununiformization suppression (Evaluation target: Solid ii)Standing condition | — | — | A | — | — | A | — |
| Ununiformization suppression (Evaluation target: Solid ii)liquid addition condition | — | — | A | — | — | A | — |

| | Example 19 | Example 20 | Example 21 | Example 22 | Example 23 | Example 24 |
|---|---|---|---|---|---|---|
| Ice mix kind | La France | La France | La France | La France | La France | La France |
| Dietary fiber derived from citrus fruits kind | Herbacel | Herbacel | Herbacel | Herbacel | Herbacel | Herbacel |
| Ice mix (parts by mass) | 47.0 | 47.0 | 94.8 | 94.8 | 94.1 | 94.1 |
| Dietary fiber derived from citrus fruits (parts by mass) | 0.48 | 0.48 | 0.19 | 0.19 | 0.95 | 0.95 |

TABLE 4-continued

|  | | | | | | |
|---|---|---|---|---|---|---|
| Other dietary fibers A(parts by mass) | 0.16 | 0.16 | 0.16 | 0.16 | 0.16 | 0.16 |
| Ice piece (parts by mass) | 47.6 | 47.6 | — | — | — | — |
| Solid i (parts by mass) | 4.8 | — | 4.8 | — | 4.8 | — |
| Solid ii (parts by mass) | — | 4.8 | — | 4.8 | — | 4.8 |
| Total: Frozen dessert (parts by mass) | 100 | 100 | 100 | 100 | 100 | 100 |
| Solid-liquid separation suppression (Evaluation target: Ice piece)Standing condition | A (Condition 2) | A (Condition 2) | A (Condition 2) | A (Condition 2) | A (Condition 2) | A (Condition 2) |
| Solid-liquid separation suppression (Evaluation target: Ice piece)liquid addition condition | A (Condition 4) | A (Condition 4) | — | — | — | — |
| Ununiformization suppression (Evaluation target: Solid i)Standing condition | A | — | A | — | A | — |
| Ununiformization suppression (Evaluation target: Solid i)liquid addition condition | A | — | — | — | — | — |
| Ununiformization suppression (Evaluation target: Solid ii)Standing condition | — | A | — | A | — | A |
| Ununiformization suppression (Evaluation target: Solid ii)liquid addition condition | — | A | — | — | — | — |

Other dietary fibers A: Fibryxa
Solid i: Black crunch B-LO (sepcific gravity: about 0.8)
Solid ii: Couverture bitter flake (sepcific gravity: about 1.3)
Condition 1: standing at 5° C.,
Condition 2: standing at 22° C.
Condition 3: milk is added,
Condition 4: hot water is added

TABLE 5

|  | Example 25 | Example 26 | Example 27 | Example 28 | Example 29 | Example 30 | Example 31 | Example 32 |
|---|---|---|---|---|---|---|---|---|
| Ice mix kind | Watermelon | La France | La France | La France | Watermelon | La France | La France | La France |
| Dietary fiber derived from citrus fruits kind | Lemon fiber | Lemon fiber | Lemon fiber | Lemon fiber | CITRI-FI | CITRI-FI | CITRI-FI | CITRI-FI |
| Ice mix (parts by mass) | 49.7 | 69.6 | 66.2 | 66.2 | 49.7 | 69.6 | 66.2 | 66.2 |
| Dietary fiber derived from citrus fruits (parts by mass) | 0.10 | 0.14 | 0.14 | 0.14 | 0.10 | 0.14 | 0.14 | 0.14 |
| Other dietary fibers A(parts by mass) | 0.17 | 0.24 | 0.23 | 0.23 | 0.17 | 0.24 | 0.23 | 0.23 |

TABLE 5-continued

|  | Example 25 | Example 26 | Example 27 | Example 28 | Example 29 | Example 30 | Example 31 | Example 32 |
|---|---|---|---|---|---|---|---|---|
| Ice piece (parts by mass) | 50 | 30 | 28.6 | 28.6 | 50 | 30 | 28.6 | 28.6 |
| Solid i (parts by mass) | — | — | 4.8 | — | — | — | 4.8 | — |
| Solid ii (parts by mass) | — | — | — | 4.8 | — | — | — | 4.8 |
| Total: Frozen dessert (parts by mass) | 100 | 100 | 100 | 100 | 100 | 100 | 100 | 100 |
| Solid-liquid separation suppression (Evaluation target: Ice piece) Standing condition | A (Condition 1) | A (Condition 2) | A (Condition 2) | A (Condition 2) | A (Condition 1) | A (Condition 2) | A (Condition 2) | B (Condition 2) |
| Solid-liquid separation suppression (Evaluation target: Ice piece) liquid addition condition | — | A (Condition 4) | A (Condition 4) | B (Condition 4) | — | A (Condition 4) | B (Condition 4) | B (Condition 4) |
| Ununiformization suppression (Evaluation target: Solid i) Standing condition | — | — | A | — | — | — | B | — |
| Ununiformization suppression (Evaluation target: Solid i) liquid addition condition | — | — | A | — | — | — | A | — |
| Ununiformization suppression (Evaluation target: Solid ii) Standing condition | — | — | — | A | — | — | — | A |
| Ununiformization suppression (Evaluation target: Solid ii) liquid addition condition | — | — | — | B | — | — | — | A |

Other dietary fibers A: Fibryxa
Solid i: Black crunch B-LO (sepcific gravity: about 0.8)
Solid ii: Couverture bitter flake (sepcific gravity: about 1.3)
Condition 1: standing at ° C.,
Condition 2: standing at 22° C.
Condition 3: milk is added,
Condition 4: hot water is added

TABLE 6

|  | Example 33 | Comparative Example 12 | Comparative Example 13 | Comparative Example 14 | Comparative Example 15 |
|---|---|---|---|---|---|
| Ice mix kind | La France | La France | La France | La France | La France |
| Dietary fiber derived from citrus fruits kind | Herbacel | — | — | — | — |
| Ice mix (parts by mass) | 49.7 | 49.7 | 49.8 | 47.4 | 47.4 |
| Dietary fiber derived from citrus fruits (parts by mass) | 0.10 | — | — | — | — |
| Deacylated gellan gum (parts by mass) | — | 0.1 | 0.005 | 0.005 | 0.005 |
| Other dietary fibers A (parts by mass) | 0.17 | 0.17 | 0.17 | 0.16 | 0.16 |

TABLE 6-continued

| | Example 33 | Comparative Example 12 | Comparative Example 13 | Comparative Example 14 | Comparative Example 15 |
|---|---|---|---|---|---|
| Ice piece (parts by mass) | 50 | 50 | 50 | 47.6 | 47.6 |
| Solid i (parts by mass) | — | — | — | 4.8 | — |
| Solid ii (parts by mass) | — | — | — | — | 4.8 |
| Total: Frozen dessert (parts by mass) | 100 | 100 | 100 | 100 | 100 |
| Solid-liquid separation suppression (Evaluation target: Ice piece) Standing condition | A (Condition 2) | N.D. | C | C | C |
| Solid-liquid separation suppression (Evaluation target: Ice piece) liquid addition condition | A (Condition 4) | N.D. | C | C | C |
| Ununiformization suppression (Evaluation target: Solid i) Standing condition | — | — | — | C | — |
| Ununiformization suppression (Evaluation target: Solid i) liquid addition condition | — | — | — | C | — |
| Ununiformization suppression (Evaluation target: Solid ii) Standing condition | — | — | — | — | C |
| Ununiformization suppression (Evaluation target: Solid ii) liquid addition condition | — | — | — | — | C |

Other dietary fibers A: Fibryxa
Solid i: Black crunch B-LO (sepcific gravity: about 0.8)
Solid ii: Couverture bitter flake (sepcific gravity: about 1.3)
Condition 1: standing at 5° C., Condition 2: standing at 22° C.
Condition 3: milk is added, Condition 4: hot water is added
N.D.: unevaluable (because a sample is solid and hardened in a jelly form, and cannot be manufactured)

As shown in the Tables, with Examples using a citrus fiber, it was possible to suppress the solid-liquid separation. On the other hand, with Comparative Examples 1 to 11 not using a citrus fiber, it was not possible to suppress the solid-liquid separation. Incidentally, in Comparative Example 2, the proportions of the water-insoluble dietary fiber and the water-soluble dietary fiber were adjusted as with Herbacel AQ Plus CF-D100. However, it was not possible to suppress the solid-liquid separation.

Further, also with Comparative Examples 12 to 15 using deacylated gellan gum used in Patent Document 1, it was not possible to suppress the solid-liquid separation.

The invention claimed is:

1. A frozen dessert, comprising:
   an ice mix;
   a dietary fiber derived from a citrus fruit; and
   a food solid, wherein
     the food solid comprises ice,
     a length of the ice is 0.06 to 14 mm,
     an amount of the ice is 1 to 20% by mass based on the mass of the frozen dessert, and
     the frozen dessert comprises 17 to 43% by mass of saccharides.

2. The frozen dessert according to claim 1, wherein
   the food solid further comprises a second food solid other than ice,
   a length of the second food solid other than ice is 0.9 to 14 mm, and
   an amount of the second food solid other than ice is 1 to 20% by mass based on the mass of the frozen dessert.

3. The frozen dessert according to claim 1, wherein the citrus fruit is a citrus fruit of genus Citrus.

4. The frozen dessert according to claim 3, wherein the citrus fruit of genus Citrus is a lemon or an orange.

5. The frozen dessert according to claim 1, wherein an amount of dietary fiber is 0.005 to 3% by mass based on the mass of the frozen dessert.

6. The frozen dessert according to claim 1, wherein
   the dietary fiber derived from the citrus fruit comprises a water-insoluble dietary fiber, and
   an amount of the water-insoluble dietary fiber is 50 to 90% by mass based on the mass of the dietary fiber derived from the citrus fruit.

7. The frozen dessert according to claim 1, wherein
   the dietary fiber derived from the citrus fruit comprises a water-soluble dietary fiber, and
   an amount of the water-soluble dietary fiber is 5 to 30% by mass based on the mass of the dietary fiber derived from the citrus fruit.

8. The frozen dessert according to claim 1, wherein a specific gravity of the food solid is 0.7 to 1.2.

9. The frozen dessert according to claim 1, wherein the frozen dessert has an upper surface having a concave part to accommodate a liquid.

* * * * *